R. BAUMANN & C. P. BUTZ.
ROUND CORNERING MACHINE FOR BOOKBINDING.
APPLICATION FILED JULY 5, 1916.

1,285,593.

Patented Nov. 26, 1918.
5 SHEETS—SHEET 1.

Inventors
Robert Baumann
and Charles P. Butz.
By Edward E. Longan
Atty

UNITED STATES PATENT OFFICE.

ROBERT BAUMANN AND CHARLES P. BUTZ, OF ST. LOUIS, MISSOURI.

ROUND-CORNERING MACHINE FOR BOOKBINDING.

1,285,593.

Specification of Letters Patent.  Patented Nov. 26, 1918.

Application filed July 5, 1916. Serial No. 107,691.

*To all whom it may concern:*

Be it known that we, ROBERT BAUMANN and CHARLES P. BUTZ, citizens of the United States, and residents of St. Louis, Missouri, have invented certain new and useful Improvements in Round-Cornering Machines for Bookbinding, of which the following is a specification containing a full, clear, and exact description, reference being had to the accompanying drawings, forming a part hereof.

Our invention relates to improvements in round cornering machines in the book binding art and it is our object primarily to construct a machine for forming round corners on leather, cloth or other material of like natures or on cases for the backs or covers of books, or for forming round corners on flexible loose covers of leather and like materials.

With the above and other objects in view which will be hereinafter specifically designated our invention consists in certain novel details of the construction and arrangement of parts which will be fully, clearly and concisely set forth in our specification, specifically pointed out in our claims and illustrated by the accompanying drawings, in which—

Referring by numerals to the accompanying drawings, 15 designates standards which are arranged to be secured upon a table or work-bench in each of which there is formed a bearing for the reception of a screw 16 upon which screws there is mounted for a rocking motion the bed plate 17. In each standard 15 and concentric with the screws 16 there is formed a slot 18 and extended through each of the slots 18 into seats provided therefor in the bed plate 17 there are the screws 19 which afford a means for holding the bed plate at different angles suiting the requirements of different operators.

Mounted on top of the bed plate is a plate 20 which is as shown in the drawings substantially rectangular and secured detachably to the bed plate by means of screws 21. As shown this plate has its corners of different shapes, three of the corners being drawn to arcs of circles of different radii and the fourth corner having a diagonal cut or margin. By this expedient we are enabled to use the same plate for operation upon corners of book covers of different shapes or sizes. A further function of this plate will be hereinafter fully described.

On each side of the longitudinal median line of the bed plate is a pair of openings 22 and surrounding each of said openings, is a tubular guide 23 and in each of said guides there is carried a pin 24.

Figure 2:
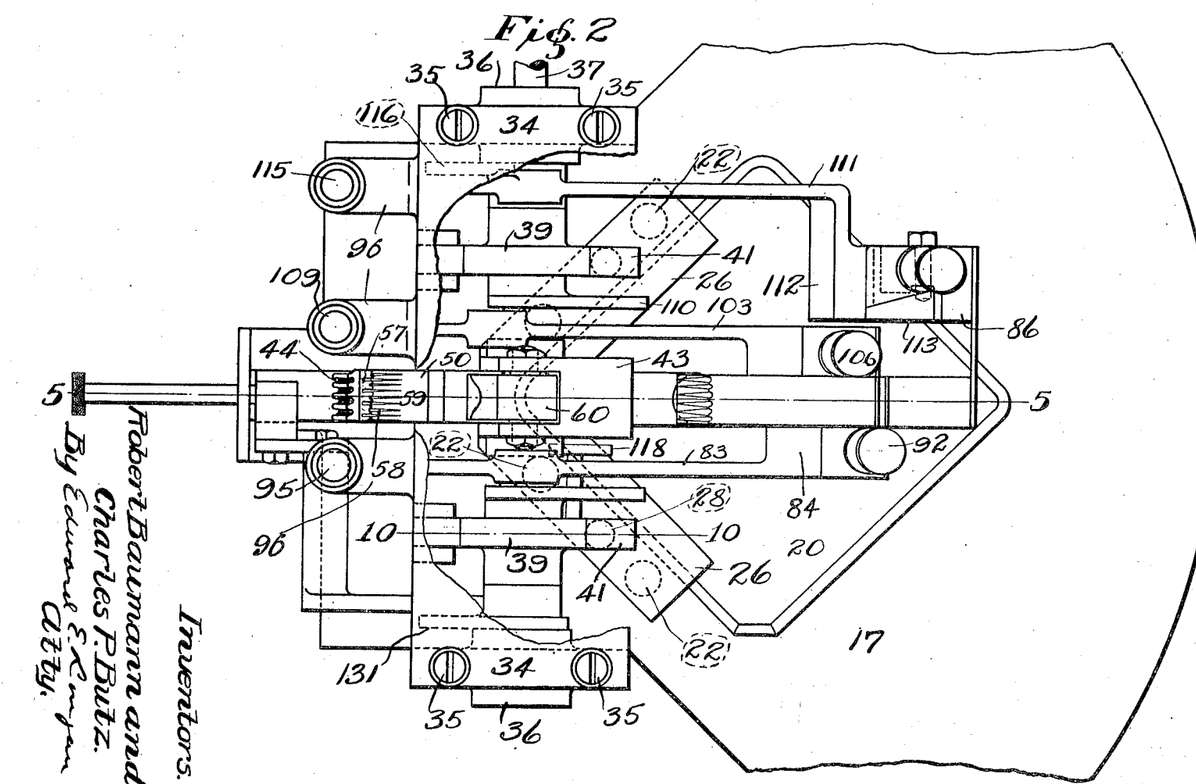
Fig. 2 is a plan of the machine, a portion of the machine head and portions of the bed plate being broken away.

Referring now to Fig. 2 of the drawings it will be observed that on each side of the longitudinal median line of the bed plate there is a pair of the openings 22 in approximate alinement with the margin of the plate 20.

Figures 3, 4, 15, 16, 17:
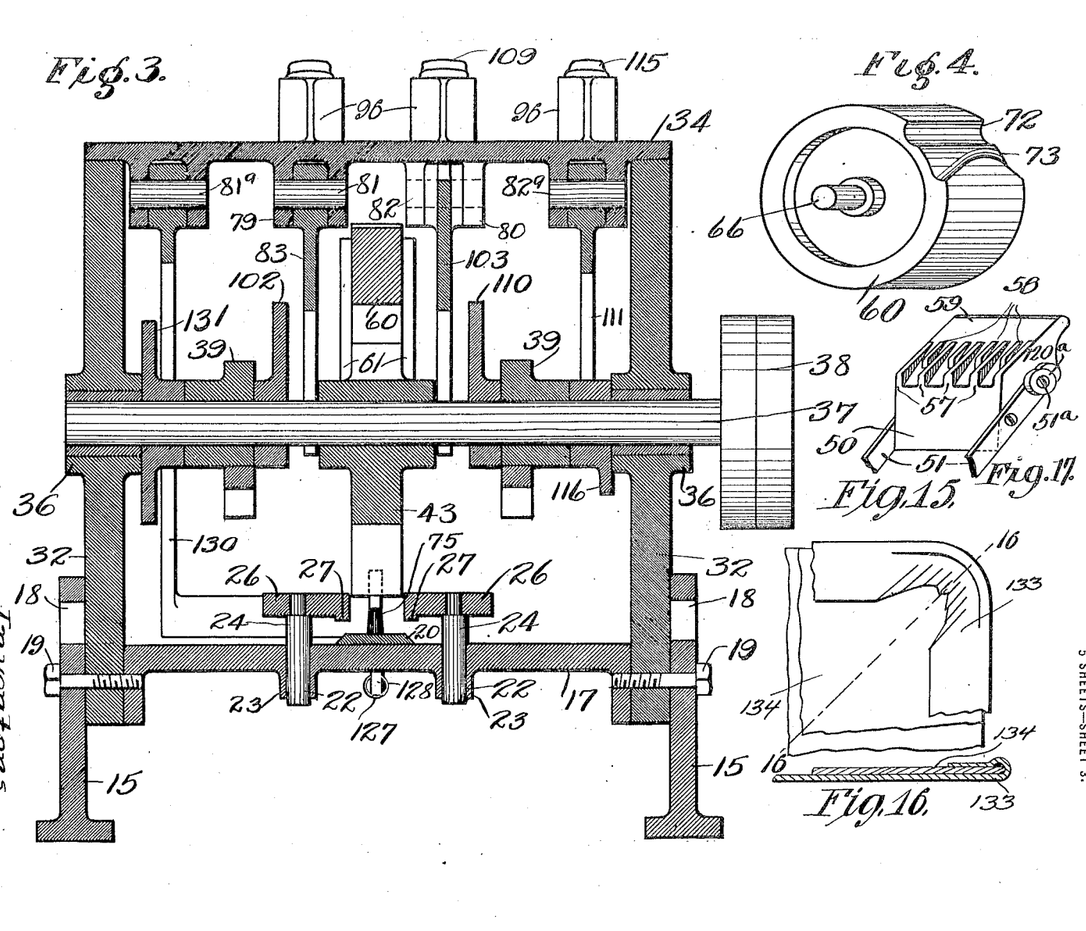
Fig. 3 is a transverse sectional elevation of the machine taken on the line 3—3 of Fig. 1.
Fig. 4 is a detail perspective view on an enlarged scale of the beading roller.
Fig. 15 is a fragmental view showing a finished "corner"
Fig. 16 is a sectional elevation taken on the line 16—16 of Fig. 15.
Fig. 17 is a perspective view of the combined plating and ironing tool which we employ in carrying out our invention.

To the upper ends of the pins 24 we secure the clamp plates 26 each of which, as shown best in Fig. 3 of the drawings, is provided with an integral strip 27 depending therefrom and next the margins, which overlie the work.

Intermediate each pair of the openings 22 is an opening 28 and depending from the bed plate in registration with the opening 28 is a tubular guide 29 arranged to receive first a coil spring 30 and secondly a pin 31. These pins extend through the clamp plates 26 and are secured against movement relative to the clamp plates, the springs 30 tending to normally hold the clamp plates elevated.

32 designates oppositely disposed cheek plates which are secured to the bed plate by means of the screws 33 as well as by the studs 16 and set screws 19. Connecting the cheek plates at their tops is a machine head 34 secured to the cheek plates by means of screws 35. Each of the cheek plates has formed therein a bearing 36 and rotatively mounted in said bearings is the main shaft of the machine 37 which extends at one end beyond the cheek plate whereby to provide for the application of power thereto.

In our drawings we show pulleys 38 for belting not shown for connection with any suitable motor but we do not wish to be understood as limiting ourselves to a power driven machine as we have demonstrated the practicability of operating this machine manually.

Arranged upon the shaft 37 and on each side of the longitudinal median line of the machine and over the pins 31 is a cam 39 secured to rotate with the shaft. The periphery of each of the cams 39 is concentric for a major portion of the circumference, the minor peripheral surface being eccentric, as shown in Fig. 10.

Figures 1, 12:
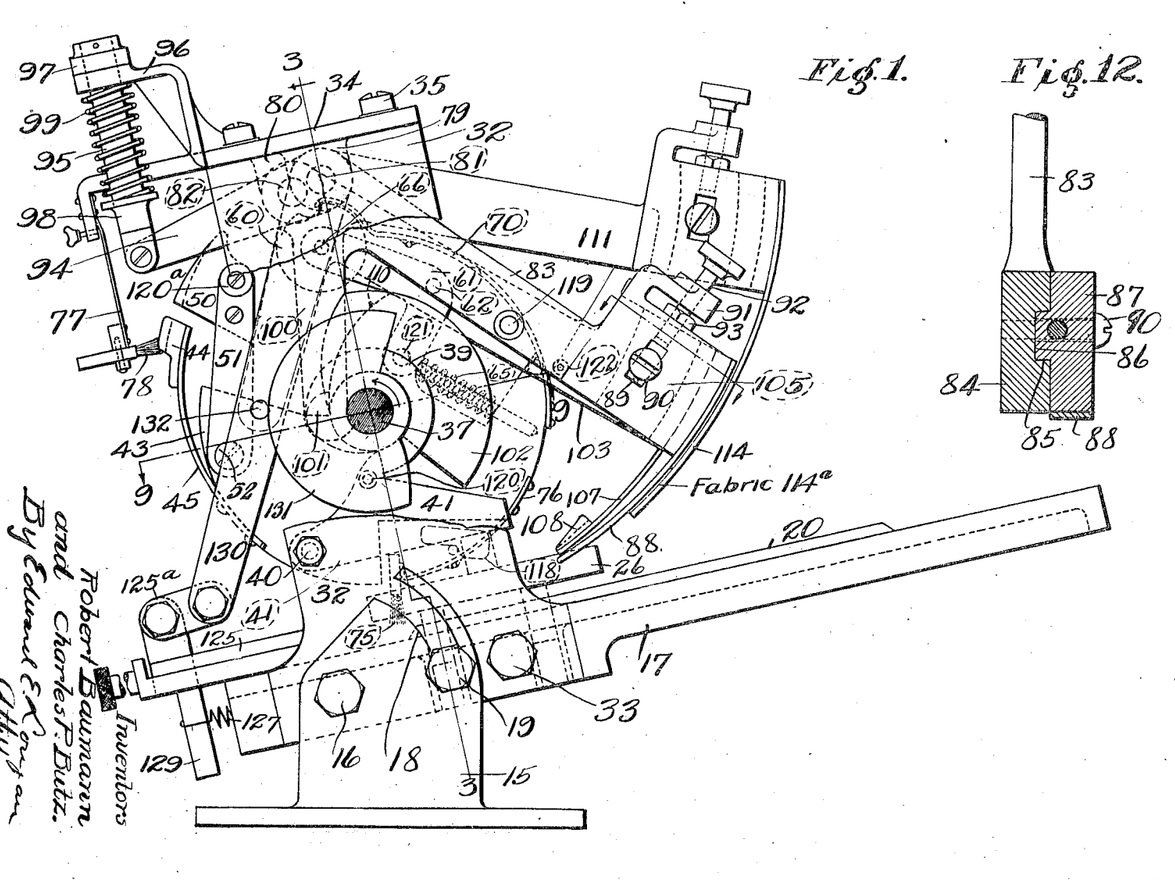
Figure 1 is a side elevation of a machine embodying our invention with a part of the machine frame broken away and the main shaft shown in section.
Fig. 12 is a detail sectional elevation of one of the heads and adjustable blocks for carrying certain of the tools.
Figures 9, 10, 11, 13:
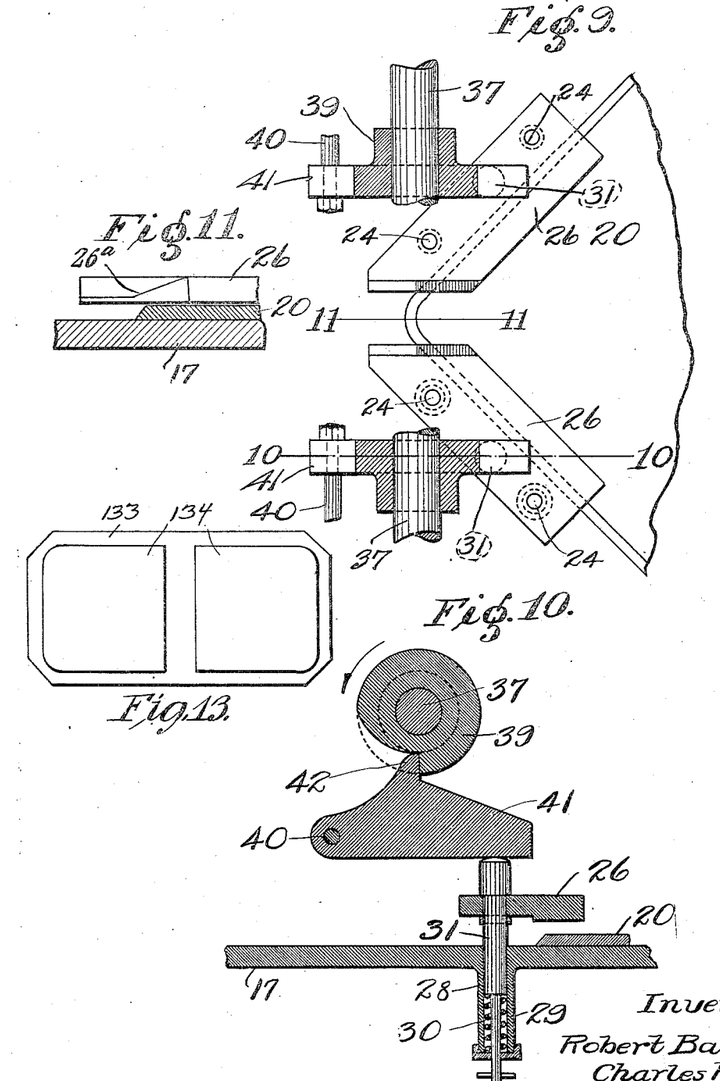
Fig. 9 is a fragmental plan showing the clamp and a part of its operating means.
Fig. 10 is a sectional fragmental elevation of the clamp and its operating means taken on the line 10—10 of Fig. 9.
Fig. 11 is a detail sectional elevation showing an incline on one of the clamping plates for the lifting of the combined fluting and smoothing tool.
Fig. 13 shows in plan a pair of body portions of a binding and a flexible case therefor.

Located in each cheek plate of the machine and extending horizontally and inwardly relative to the cheek plates are the stub shafts 40 on each of which is pivotally mounted a lever 41, see Figs. 1, 9 and 10, the outer free ends of which levers are arranged to be engaged at all times by the pins 31 and the noses 42 of said levers arranged to engage at all times with the peripheries of the cams 39. It is apparent by this showing that when the main shaft 37 is rotated the eccentric portions of the cams 39 will gradually bear upon the noses 42 of the levers 41 and thus depress the clamp plates 26 to engage the work. The concentric portions of the cams through the engagement of the nose of the lever 41 hold the clamps in depressed work performing positions for a considerable length of time after which the springs 30 will elevate the pins thus carrying the clamps to an open or non-working position, the noses 42 being raised to engage the eccentric portions of the cams. In our drawings we show this eccentric portion of each cam as being approximately one-fourth the circumference of the cam, but obviously this measurement may vary without departing from the spirit of our invention. The essential of this measurement is that the concentric surface of the cam shall have length enough to cause the clamps to be held depressed during as much of each rotation of the shaft as is required for the principal work performing elements of the machine to act properly on the work.

Carried by the main shaft and in a manner to rotate therewith and intermediate the cams 39 is a carrier 43 and arranged in this carrier and in the following order is a number of the principal work performing elements of the machine.

First, a coarse fluting tool 44 the lowermost face of which is undulated or ribbed, this tool being mounted upon a leaf spring 45 secured to the periphery of the carrier 43, its point of attachment to the carrier being in advance of the tool proper so that in a rotation of the carrier the leaf spring serves to drag the tool over the work. In a bearing 46 formed in the carrier there is arranged a pin 47 adjacent the free end of which there is a tubular cap 48 arranged to bear upon the leaf spring 45 immediately over the tool 44 and on the pin 47 and impinging between a portion of the carrier 43 and the cap 48 is a coil spring 49.

Second in order on the carrier 43 is a combined fluting and ironing tool 50. This tool is secured to a pair of arms 51 by screws 51ᵃ and pivotally secured by screws 52 to the carrier 43. In order that the free end of the arms 51 hold the tool 50 outwardly relative to the shaft 37, we arrange a pin 52ᵃ secured to the carrier in a bearing formed therefor and mount upon this pin a cap 53 which bears upon the upper face of the tool between its supporting arms 51, and embracing the pin 52ᵃ and impinging a portion of the carrier and said cap 53 is a coil spring 54. It is to be observed that the one arm 51 carrying the tool 50 has greater length than its companion and adjacent its end opposite the tool there is a recess 55 operating in conjunction with a pin 56 to limit the outward movement of the tool 50. The working surface of the tool 50 comprises an undulated or ribbed portion 57 of like character with the surface of the tool 44 which is as previously stated a coarse fluting tool. Immediately following the surface 57 is a second undulated surface 58 having ribs which are located in lines paralleling the ribs of the surface 57 and also ribs intermediate the ribs paralleling the ribs of the surface 57, as shown in Fig. 2. In other words there are just twice the number of ribs on the surface 58 as there are ribs on the surface 57. The ribs on the surface 58 are longitudinally tapered and at their rearmost ends disappear.

Immediately following the surface 58 just described and an integral continuity thereof is a smooth surface 59 hereinbefore termed an ironing surface.

Third in order on the carrier 43 is a combined finishing and beading roller 60. This roller is rotatably mounted in the free ends of a pair of bell-crank levers 61 which are carried on pivots 62 secured in the carrier 43. Between the short arms 63 of the bell-crank levers is a block 64 and in the carrier mounted and acting similarly to the spring devices of the first and second mentioned tools is a spring device 65 whose end engages the block 64. The rotatable support previously referred to for the roller 60 is a shaft 66, mounted in the free ends of the bell-crank levers 61 and embracing the shaft is a coil spring 67 having its one end secured to the roller and its other end secured to one of the said bell-crank levers. Extending from the periphery of the roller 60 is a pin 68 and extending laterally from one of the bell-crank levers 61 is a stop 69, which pin and stop serve as a means for limiting the rotation of the roller in one direction. Secured to the carrier 43 to the rear of the roller 60 is a leaf spring 70 which is shaped at its free end to conform with the roller 60 and terminates in a hook 71 which is arranged to hook into a depression 72 formed in the periphery of the roller.

As shown in the detail Fig. 4 of the drawings there is formed on the periphery of the roller 60 in advance of the depression 72 an rounded shoulders 73, it being understood that the face of the roller between the shoulder 73 and depression 72 is depressed from the periphery of the roller for a purpose hereinafter made clear.

Extending laterally from the leaf spring 70 is a stub 74 engageable with an element hereinafter made clear for the release of the hook from the depression in the roller.

Next in order upon the carrier 43 is a brush 75 yieldingly mounted upon a spring 76 secured to the carrier, it being the function of this brush to apply a lubricant to tools to be hereinafter described which act on the work with the tools mounted upon the carrier 43. Depending from the machine head and to the rear of the carrier 43 is a spring arm 77 having detachably secured at its free end a brush 78 which is arranged to hold a lubricant, and apply same to the plaiting and smoothing tools on the carrier as well as the beading roller 60.

While we have not shown the same on the drawings we contemplate the employment of a constant source of lubricant supply to the brush 78 and it is to be understood that the brush 78 stands in the path of movement of the brush 75, whereby the brush 75 will receive its lubricant from the brush 78.

Figures 5, 6, 7, 14:
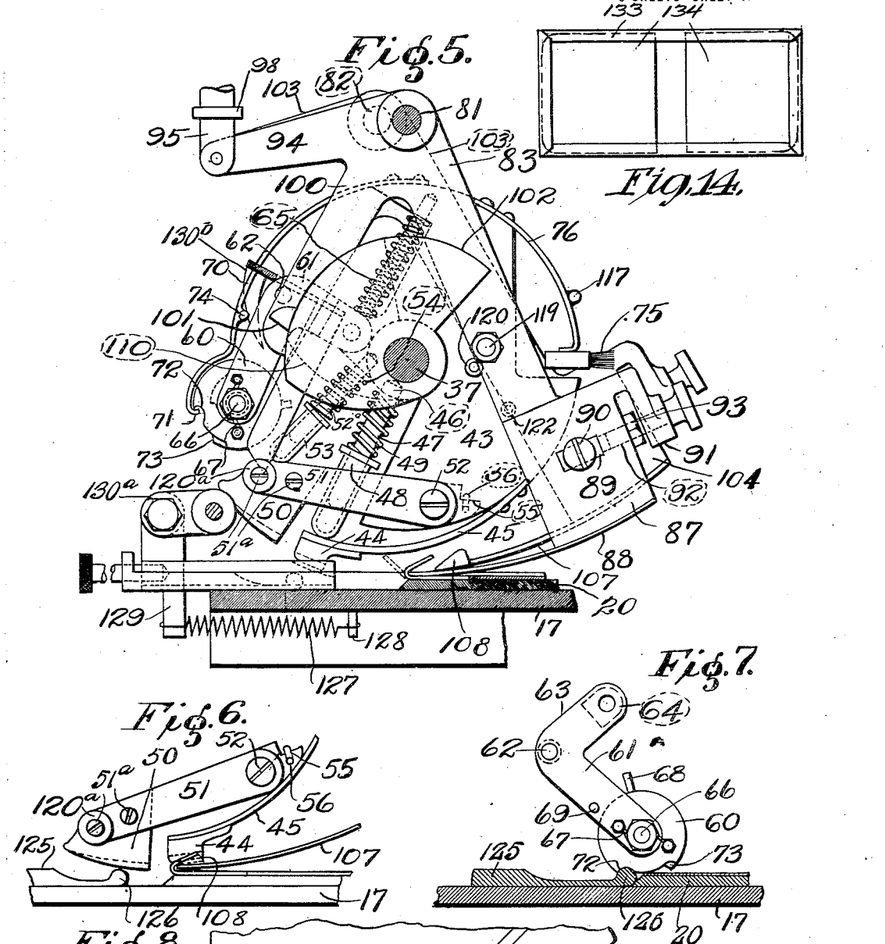
Fig. 5 is a longitudinal sectional elevation taken approximately on the line 5—5 of Fig. 2 showing only the principal work performing elements of our machine.
Fig. 6 is a fragmental elevation showing the shaping and fluting tools.
Fig. 7 is a fragmental elevation showing the beading roller.
Fig. 14 is a view similar to Fig. 13 with the edges of the flexible case turned over the body portions and in condition to be fed to our machine.

Depending from the machine head and on each side of the longitudinal median line of the machine is a boss 79 and 80 and secured in said bosses are the shafts 81 in the boss 79 and 82 in the boss 80. Pivotally mounted upon the shaft 81 is an arm 83 having at its free end an enlarged head 84 as shown in Fig. 12 in one face of which head there is formed a channel 85 arranged to receive the flange 86 of an adjustable block 87 to the lowermost face of which is secured a shaping tool 88. The block 87 as shown in Fig. 5 has a slot 89 arranged to receive a set screw 90 seated into the block 87 to hold the block to the head 84. Overhanging the forward end of the head 84 is a lip 91 and extended through said lip is a threaded stem 92 bearing upon the block 87 whereby to adjust it relative to the head 84 as required to bring the shaping tool to different positions with relation to the different corners of the plate 20, the block being locked against movement by means of a lock nut 93. Secured to the arm 83 preferably integral therewith is a bell-crank the one arm 94 of which extends rearwardly beneath the machine head and has pivotally connected therewith a stem 95 which extends from a bracket 96 secured to the machine head, the end thereof extending from said bracket having secured thereto a cap 97 which limits the movement of said stem in a downwardly direction. The lowermost end of the stem 95 is connected with the arm 94 and carried by the said stem is a collar 98 between which collar 98 and the bracket 96 there is a coil spring 99 which depresses the arm 94 and holds the arm 83 connected with said arm 94 to its upper or non-working position. In other words, the spring 99 depresses the arm 94 and consequently elevates the arm 83 and the shaping tool, carried thereby out of operative position.

The arm 100 of the bell crank connected with the arm 83 has adjacent its free end a stud 101 which projects laterally from the said arm 100. Secured to rotate with the main shaft 37 of the machine is a cam 102 arranged to engage the said stud to operate the arm 83 and the bell crank lever, comprising the arms 94 and 100, against the pressure of the spring 99 to swing the shaping tool 88 to a position with its free rounded end in approximate registration with the beveled round corner of the plate 20 secured to the bed plate.

Pivotally secured to the shaft 82 in the boss 80 depending from the machine head, there is an arm 103 having an enlarged head 104 at its free end constructed substantially the same as the head of the arm 83 just described and in which there is a block 105 having an adjusting means the same as carried by the arm 83, and to which block there is secured a leaf spring 107 carrying at its free end a plaiting tool 108. The arm 103 like the arm 83 has connected therewith and preferably integrally, a bell crank the one arm of which is acted upon by a spring pressed pin 109 for normally holding the arm 103 to its non-working position, and secured to the main shaft 37 of the machine is a cam 110 which engages with a stud on the one arm of the bell crank connected with the arm 103 to swing the plaiting tool 108 to its working position. Pivotally secured to the shaft 82ª is a third arm 111 having at its free end an enlarged head in which there is an adjustable block similar to the blocks carried by the other arms described, on which block there is secured a leaf spring 114 which has upon its uppermost surface at its free end a section of fabric 114ª which is arranged to bear on the lowermost face of the shaping tool 88 whereby to remove adhesive from the lowermost face of the shaping tool 88, the brush 75 as described working in opposition to the fabric upon the spring 114 to clean the upper surface of the tool 88. The arm 111 has connected with it in substantially the same manner as the arms 83 and 103 a bell crank lever, the one arm of which engages a spring-actuated pin 115 and the other arm with a cam 116 carried on the main shaft 37 of the machine.

Secured to the spring 76 which carries the brush 75 is a laterally projecting pin 117 which is arranged to be engaged by a cam 118 whereby to move the brush out of its normal path to wipe over the shaping tool 88 as well as the first plaiting tool 44 and then recede to its normal position.

It is to be observed that the leaf spring 88 hereinbefore termed the shaping tool is eccentric to the main shaft of the machine, whereby its free end will be brought to bear with some considerable pressure upon the work or plate 20 in order to assure its free end being brought beneath the portion of the leather or cloth cover which is to be acted upon by the tools.

Projecting inwardly, that is toward the longitudinal median line of the machine from the arm 83 is a stud 119 and secured to the carrier and revoluble therewith is a friction roller 120, see Fig. 1, for engagement with the stud 119 which serves the function of positively moving the shaping tool 88 out of the work and assists the spring to continue the movement of the shaping tool 88 to its non-working position. On the opposite side of the carrier and rotatable therewith is a stud 121 which is arranged to engage the friction pin 122 on the arm 103 whereby to positively move the first fluting tool 108 out of position in the work in the event of its having been stuck in the work by the adhesive or by friction to permit the spring device to move the tool 108 to its non-working position.

Figure 8:
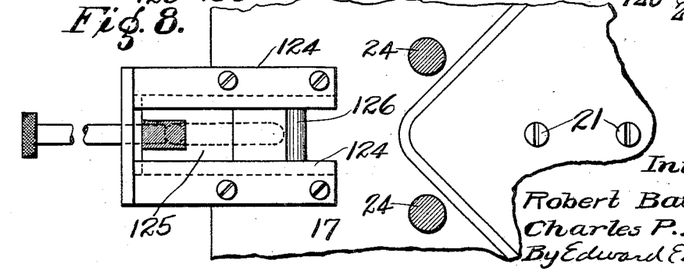
Fig. 8 is a fragmental plan partly in section showing the sliding element controlling the movement of the beading roller.

As shown in Fig. 8 there is secured to the rear end of the bed plate of the machine a pair of spaced guides 124 between which there is slidably mounted a plate 125 at the forward end of which there is a bead 126 arranged to seat in the depression 72 of the beading roller whereby to accurately position the roller with respect to the location of the rounded shoulder 73 relative to the work. This plate is movable in one direction by a coil spring 127 secured at its one end to a pin 128 depending from the bed plate and at its other end to a pin 129 depending from said plate. For positively moving the plate 125 in opposition to the spring 127 we have arranged a lever 130 which is hung from the shaft 81ª and connects with the plate 125, through the link 125ª which allows for the arcuate movement of the lever 130.

Arranged on the main shaft is a cam 131 which when the main shaft is rotated engages a pin 132 carried by the arm 130. The cam 131 is shaped so that when the plaiting tools on the rotatable carrier are being brought to position the plate 125 will be at its rearmost position permitting said rotating tools to traverse their paths without meeting the bead 126 of the said sliding plate and when the plaiting tools are brought to their working positions the said cam 131 will move the sliding plate and bead 126 into position to act upon the beading roller to properly position it.

In order that the brush 75 be moved out of its normal path to engage with the fixed brush 78 so that the brush 78 may supply the brush 75 with lubricant, we mount upon the arm 130 a cam 130ᵇ which stands in the path of travel of the laterally projecting pin 117 so that when the pin 117 meets the cam 130ᵇ on the arm 130, the brush 75 will be moved outwardly to engage the brush 78 and then recede to its normal position in the rotating carrier.

In order to prevent a tearing of the covering when the tool 88 is in position in the covering we provide an inclined plane 26ª on one of the clamps 26 to be engaged by the roller 120ª carried by the combined plaiting and smoothing tool 50 in order to lift the tool 50 free from the covering so that the tool 88 will be relieved from the pressure of the tool 50 and may withdraw from under the corner of the covering without dragging the corner with it.

In order to make clear the operation of the machine and the function of each element thereof it is believed the nature of the materials acted upon should be explained. In book binding the body portions of the cover consist usually of two pieces of card board 134 or analogous material and a covering which is adhesively secured to the card board with its margins doubled over the margins of the cover and secured. Usually there is a facing of paper or the like adhesively secured over the card board and the overturned margin of the covering. This machine is especially designed for uniformly shaping the corners of covers of any flexible material inclusive of leather, cloth and other like fabrics. It is a matter of book binders' knowledge that the round corners of the covers are not uniformly round. This rounding is usually done by hand and for this reason the curvatures of the corners differ. By the employment of the machine of our invention the corners of the covers are applied to the corners of the inner lining and the binding has uniformly round corners of like curvatures regardless of the non-uniformity of the corners of the inner lining of card board and the like. The covers constituting part of the work on which this machine operates, are usually cut to a size somewhat larger than the inner lining whereby their margins may overlap and cover the margins of the inner lining. The turned-over margins of the cover at the corners are cut diagonally, see Fig. 13. The overlapping margin of the cover is supplied with an adhesive and doubled over the lining usually by hand, leaving the corners square as shown in Fig. 14. In this position the cover is then ready to be placed in the machine.

Assuming the machine to be in an operative condition as represented in Fig. 1 with the clamp plates 26 elevated, and also the shaping tool 88, the fluting tool 108, and the leaf spring 114 elevated sufficiently above the plate 20 to permit the free introduction of a cover under the said clamp plates; the covers prepared, as above stated, are then placed in the machine, the pins 24 serving as guides for the proper position of the cover.

Assuming power to be applied to the main shaft the first movement of the main shaft operates the cams which depress the clamp plates so that the first step of the machine is to securely fasten the work. A continued movement of the main shaft causes the brush 75 to wipe over the shaping tool 88 and the plaiting tool 108. The cams which operate the tool 88 and the fluting tool 108 then engage the arms carrying said tools and move them, the tool 88 being brought first to engage the work over the plate 20 so that it will properly draw the corner of the cover to a true position and engage under the turned-over margins of the cover having adhesive applied thereto, the cam which operates the said tool 88 moving said tool to exactly the same position at each operation, the tool carrying some adhesive along its forward margin. The coarse plaiting tool 108 is next moved to a position immediately over the top of the tool 88 and underneath the said overhanging margin of the cover. A further rotation of the shaft brings the coarse plaiting tool 44 to draw over the top of the cover and the two tools 44 and 108 produce corrugations or plaits in the said overhanging portions of the cover. With the plaiting tool 108 held, the rotary carrier continues its movement and immediately after the first or coarse section 57 of the tool 50 engages the plaits made upon a corner by the first tool 44, the cam 110 releases the tool 108, same being returned to its normal or non-working position. While the coarse section 57 of the tool 50 holds the plaits in position as it passes on, the finer plaited section 58 of the tool 50 increases the original number of plaits to approximately twice the number and thereby to half-size. The smooth section 59 following, produces an almost smooth face upon the corner. At the instant the smooth or ironing section of the tool has done its work, the roller 120ª mounted upon the side of the tool, climbs up the incline 26ª formed on one of the clamp plates 26, Fig. 11, thereby raising the tool 50 off of the work, releasing its pressure upon the work as also upon the shaping tool 88. A continued movement of the shaft brings the beading roller to position and also the sliding plate 125 to a place where the bead 126 upon the sliding plate 125 will accurately position the roller with respect to the work. Just before the beading roller rolls off of the bead 126 onto the work, the cam 102 releases the shaping tool 88 and by the pressure of the spring 99 actuating the arm 83, the shaping tool returns into its normal or non-working position. When the depression 72 in the beading roller engages the bead 126, see Figs. 4, 6, and 7 the roller is slightly elevated. Being carried forward and rolling down off of the bead 126, the shoulder 73 formed in the face of the roller presses a finely finished bead along and paralleling the edge of the rounded corner as shown in Fig. 15. The roller continuing under pressure over the corner unites firmly the parts forming the cover, said parts having been previously supplied with adhesive. The roller having performed its work, the cam 131 permits the sliding plate 125 to move to its rearmost position so that the tools may pass the bead 126. The cam 116, through the motion of the arm 111, causes the fabric 114ª upon the leaf spring 114 to move forward, cleaning the lower face of the shaping tool. The fabric being saturated with a lubricant, applies same to the tool, keeping it free from adhesive. The next and last operation performed during one revolution of the main shaft 39 releases the clamp plates 26, and the machine is stopped, the cover turned and another corner placed in position to be rounded.

It is essential to the successful working of the machine to keep all the working tools constantly clean and lubricated. The brush 75 revolving with the carrier 43 positively cleans and lubricates the tools 88 and 108. The stationary brush 78 cleans and lubricates the tools 44 and 50 and also the working section of the face of the beading roller. In order to present the working section of the face of the beading roller to the brush 78, we arrange the leaf spring 70 with its hook 71 to catch in the depression 72 of the beading roller, immediately after the roller has performed the function of beading the corner of the cover. This movement, it is obvious, has rolled or moved the beading roller on its axis, thereby necessitating a reverse rotation of the beading roller which is accomplished by releasing the hook 71 from the depression in the roller and permitting the coil spring carried by the roller to act to move the working surface of the roller into a position to be supplied with the lubricant from the brush 78.

It will be seen therefore that by the use of our invention, we can produce a cover having uniformly rounded corners whether lined or unlined, and that we can form such uniformly rounded corners on covers of any size; that is to say, corners of different radii. This is made possible by the operation heretofore described, wheren we manipulate the cover by first cutting off the corner of the covering as shown in Fig. 13, and in Figs. 14 and 15 we have shown the margin of the cover folded, and finished with a bead. By the method which we employ the uniformity of the rounded corners is produced by subjecting the turned over margins of the cover to a series of plaiting operations. After the first plaiting operation the subsequent plaiting operations reduce the plaits, or in effect subdivides the original plaits into a number of smaller plaits, producing a gradual shrinking or gathering of the over turned margin of the covering at the corners. And the last step performed is the smoothing or flattening of the plaits and the producing of beads beyond the plaits.

Having thus described our invention what we claim as new therein and desire to secure by Letters-Patent of the United States, therefor is:

1. In a book making machine, a shaping tool provided with a portion shaped to the corner of the cover desired, means co-acting with said shaping tool for plaiting at least a portion of a corner of the cover over such shaping tool, an ironing element arranged to act on the plaited portion of the cover, and a clamp for holding the cover while being acted upon by said shaping tool and said ironing means.

2. In a book cover making machine, a yieldingly mounted shaping tool shaped to the corner of cover desired, means for moving said tool between the covering and its over-turned margin, rotatably and yieldingly mounted plaiting tools for conforming said over-turned margin of the cover to said shaping tool, and means for simultaneously moving the shaping and plaiting tools.

3. In a book cover making machine, a tool provided with a portion shaped to the corner of the cover desired, rotatably mounted plaiting means for conforming an over-turned margin of the cover to said shaping tool, means for moving both shaping tool and said plaiting means, and means for holding the cover immovable during the operations of said shaping tool and plaiting means.

4. A book cover making machine comprising means for holding a book cover, having an overturned margin, a shaping tool provided with a portion shaped to the corner of cover desired, means for conforming the overturned margin of the cover to the shaping tool, means for plaiting a portion of the overturned margin lying over said shaping tool, means for ironing or smoothing said plaited margin of the cover, and means for timing the operation of all of said parts.

5. In a book cover making machine, a yielding plate provided with a beveled marginal portion shaped to approximately conform to the corner of cover desired, means for moving said plate between the covering and its over-turned margin, a shaping tool mounted above said plate movable with respect to said plate and provided with a portion shaped to conform to the corner of cover desired, and a yieldingly mounted rotating tool arranged above said plate and first mentioned tool and for movement with respect to said plate and shaping tool.

6. In a book cover making machine, a yieldingly mounted arm, a yielding shaping tool carried by said arm, a book cover support positioned below said shaping tool and in the path thereof, clamping means for clamping the book cover to said support, and means for operating the clamping means in advance of the operation of the yielding shaping tool.

7. A book cover making machine comprising a support for a cover having an overturned margin supplied with adhesive, a movable element provided with a portion shaped to conform to corner of cover desired, a second element movable over the first mentioned element, a third element arranged to carry said overturned margin of the cover over the second mentioned element and to plait the cover margin between the second and third elements, a fourth element operable in conjunction with said element for further plaiting the over-turned margin of the cover, means for withdrawing the said second mentioned element immediately following the plaiting operations, said fourth mentioned element being provided with an ironing surface for smoothing the plaited portion of the cover margin, a fifth element arranged to form an upstanding bead on the said cover margin, and means for withdrawing the first mentioned element after the smoothing and beading operations.

8. A book cover making machine comprising means for holding a cover provided with an overturned margin supplied with an adhesive, means for opening up the overturned margin of the corner, means for successively plaiting the overturned margin of the corner, and means for flattening or smoothing said plaited or crimped margin of the corner.

9. A book cover making machine comprising means for holding a cover provided with an overturned margin supplied with an adhesive, means for opening up the overturned margin of the corner, means for successively plaiting the overturned margin of the corner, means for flattening or smoothing said plaited margin of the corner, and means for beading the corner beyond the plaits.

10. The herein described method of making book covers which consists in: first, cutting the covers to the desired size and removing the corners thereof; second, turning over the margins of the cover and applying an adhesive to the folded over margin; third, successively plaiting the turned-over margin of the cover whereby the corner margin is shortened; fourth, applying pressure to said plaited corner and simultaneously forcing the adhesive into the corner, thereby forming a bead in the same beyond the plaits.

In testimony whereof, we have signed our names to this specification, in presence of two subscribing witnesses.

ROBERT BAUMANN.
CHARLES P. BUTZ.

Witnesses:
  AUG BAADE,
  OLINDA LAMPERTZ.